(12) United States Patent
Hsu et al.

(10) Patent No.: US 12,350,609 B2
(45) Date of Patent: Jul. 8, 2025

(54) PRE-WET SYSTEM HAVING PNEUMATIC CIRCULATION

(71) Applicant: HERMES-EPITEK CORPORATION, Taipei (TW)

(72) Inventors: Jui-Hsiung Hsu, Taoyuan (TW); Chi-Yi Lin, Hsinchu (TW); Yu-Liang Huang, Kaohsiung (TW); Jih-Jenn Huang, Hsinchu (TW)

(73) Assignee: Hermes-Epitek Corporation, Taipei (TW)

( * ) Notice: Subject to any disclaimer, the term of this patent is extended or adjusted under 35 U.S.C. 154(b) by 566 days.

(21) Appl. No.: 17/946,969

(22) Filed: Sep. 16, 2022

(65) Prior Publication Data
US 2023/0090558 A1 Mar. 23, 2023

(30) Foreign Application Priority Data

Sep. 17, 2021 (TW) .................... 110134890

(51) Int. Cl.
| | |
|---|---|
| *B01D 29/66* | (2006.01) |
| *B01D 29/60* | (2006.01) |
| *B01D 35/157* | (2006.01) |
| *B01D 35/16* | (2006.01) |
| *B01D 36/00* | (2006.01) |

(52) U.S. Cl.
CPC ......... *B01D 29/668* (2013.01); *B01D 29/605* (2013.01); *B01D 35/1573* (2013.01); *B01D 35/16* (2013.01); *B01D 36/00* (2013.01); *B01D 2201/165* (2013.01)

(58) Field of Classification Search
CPC .............. B01D 29/668; B01D 29/605; B01D 35/1573; B01D 35/16; B01D 36/00; B01D 2201/165; B01D 37/02
See application file for complete search history.

(56) References Cited

FOREIGN PATENT DOCUMENTS

TW 201015228 A * 4/2010

* cited by examiner

*Primary Examiner* — Waqaas Ali
(74) *Attorney, Agent, or Firm* — Donald E. Stout; Stout, Uxa & Buyan, LLP

(57) ABSTRACT

In some embodiments, a system for pre-wetting a filter includes a filter, a piping system, a first gas, a second gas, a first buffer tank, and a second buffer tank. The first gas drives the solvent to clean the filter. The two buffer tanks store the solvent discharged from the filter. The second gas selectively drives the solvent in the first buffer tank to return to the filter and then to be discharged into the second buffer tank. Alternatively, the second gas selectively drives the solvent in the second buffer tank to return to the filter and then to be discharged into the first buffer tank.

10 Claims, 10 Drawing Sheets

PRE-WET SYSTEM HAVING PNEUMATIC CIRCULATION

CROSS-REFERENCE TO RELATED APPLICATIONS

The entire contents of Taiwan Patent Application No. 110134890, filed on Sep. 17, 2021, from which this application claims priority, are expressly incorporated herein by reference.

BACKGROUND OF THE INVENTION

1. Field of the Invention

The present invention relates to a system for pre-wetting semiconductor process solution filters.

2. Description of Related Art

Resist Filter Pre-Wet Station is a system for pre-wetting and cleaning photoresist filters. One or multiple unused photoresist filters with different specifications are cleaned and soaked through the washing or circulation of organic solvent to effectively remove impurities and particles in the filters, thereby improving the cleanliness and efficiency of the photoresist filters when they are used later.

If the pre-wetting procedure is not thorough for an unused photoresist filter, there will be unwetted part in the filter, and this unwetted part will not be able to be cleaned and a longer time will be taken to filter out the impurities or particles. In this way, the efficiency of the filter is greatly reduced, which then affects the cleanliness of the connected pipelines when the filter is used later.

On the contrary, if the filter has been completely pre-wetted and cleaned before it is used, the impurities in the filter can be cleaned in advance, and the time for the filter to reach a usable state with optimum efficiency and cleanliness can be effectively shortened.

Taiwan Patent No. TW311097B discloses a circulating pre-wetting system, which mainly includes a first container, a pump, a filter, a second container, and a second filter. The first container contains solvent for pre-wetting the filter. The pump transports the solvent in the first container to the filter, which is used to remove impurities from the solvent. The second filter to be pre-wetted is arranged in the second container, and the filtered solvent is transported to the second container for pre-wetting the second filter and then returned to the first container.

Taiwan Patent No. TWI384330B discloses a system for pre-wetting photoresist filters. The system includes a storage tank storing a solvent and one or more pumps connected to the storage tank. Each pump delivers the solvent in the storage tank to one or more photoresist filters. In addition, a control valve is provided at a pipeline between each pump and each photoresist filter, and a control device is connected to each pump and the control valve.

Taiwan Patent No. TWI612999B discloses a photoresist filter that includes a rectangular pleated filter element, an inlet, an outlet, and a vent.

Taiwan Patent No. TWI642474B discloses a porous polytetrafluoroethylene (PTFE) membrane that can be used to filter out metals in photoresist solution.

SUMMARY OF THE INVENTION

The present disclosure relates a system for pre-wetting semiconductor process solution filters.

In some embodiments, a pre-wet system is provided with a piping system, a storage, a filter, a first gas, a second gas, a first buffer tank, a second buffer tank, and a control system. The storage tank contains a solvent. The filter connects to the piping system. The first gas drives the solvent in the storage tank to the filter via the piping system. The first buffer tank connects to the filter via the piping system to store the solvent discharged from the filter. The second buffer tank connected to the filter via the piping system to store the solvent discharged through the filter. The second gas selectively drives the solvent in the first buffer tank to return to the filter and then to be discharged to the second buffer tank via the piping system, or, the second gas selectively drives the solvent in the second buffer tank to return to the filter and then to be discharged to the first buffer tank via the piping system. The control system determines a path of the solvent.

In some embodiments, a pre-wet system is provided with a piping system, a storage, a plurality of filters, a first gas, a second gas, a first buffer tank, a second buffer tank, and a control system. The filter connects to the piping system. The first gas drives the solvent in the storage tank to each filter via the piping system. The first buffer tank connects to each of the plurality of filters via the piping system to store the solvent discharged from the filter. The second buffer tank connected to each of the plurality of filters via the piping system to store the solvent discharged through the filter. The second gas selectively drives the solvent in the first buffer tank to return to each of the plurality of filters and then to be discharged to the second buffer tank via the piping system, or, the second gas selectively drives the solvent in the second buffer tank to return to each of the plurality of filters and then to be discharged to the first buffer tank via the piping system. The control system determines a path of the solvent.

DETAILED DESCRIPTION OF THE PREFERRED EMBODIMENT

Reference will now be made in detail to those specific embodiments of the invention. Examples of these embodiments are illustrated in accompanying drawings. While the invention will be described in conjunction with these specific embodiments, it will be understood that it is not intended to limit the invention to these embodiments. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well-known process operations and components are not described in detail in order not to unnecessarily obscure the present invention.

Figure 1A:
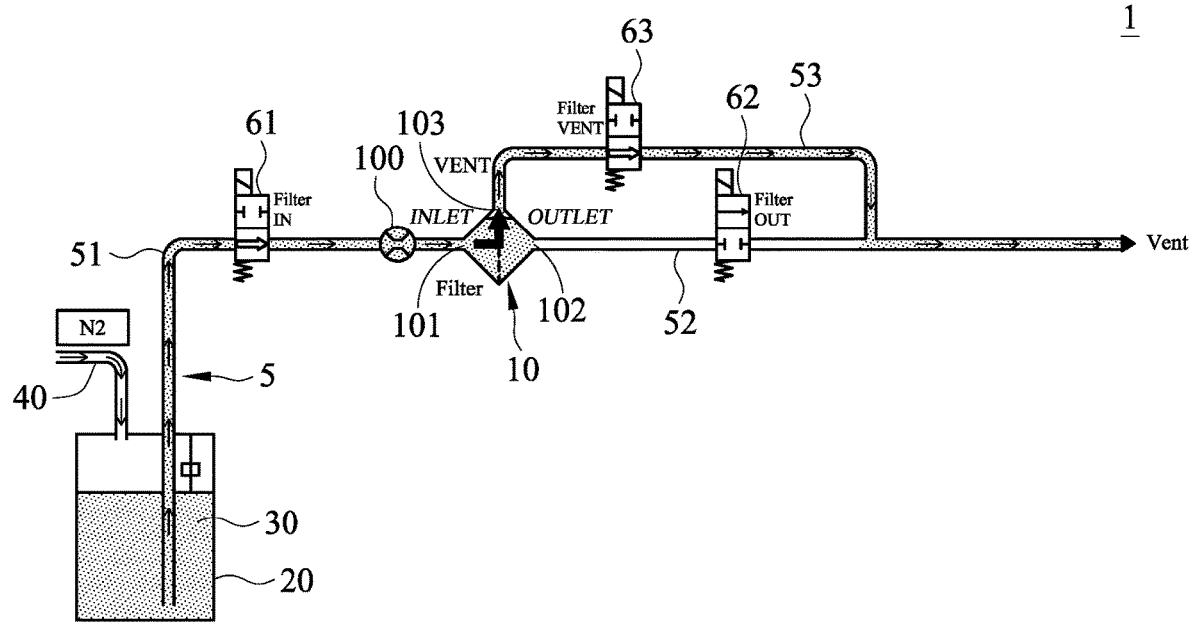
FIG. 1A and FIG. 1B are schematic diagrams showing a pre-wet system in accordance with an embodiment of the present invention.
Figure 1B:
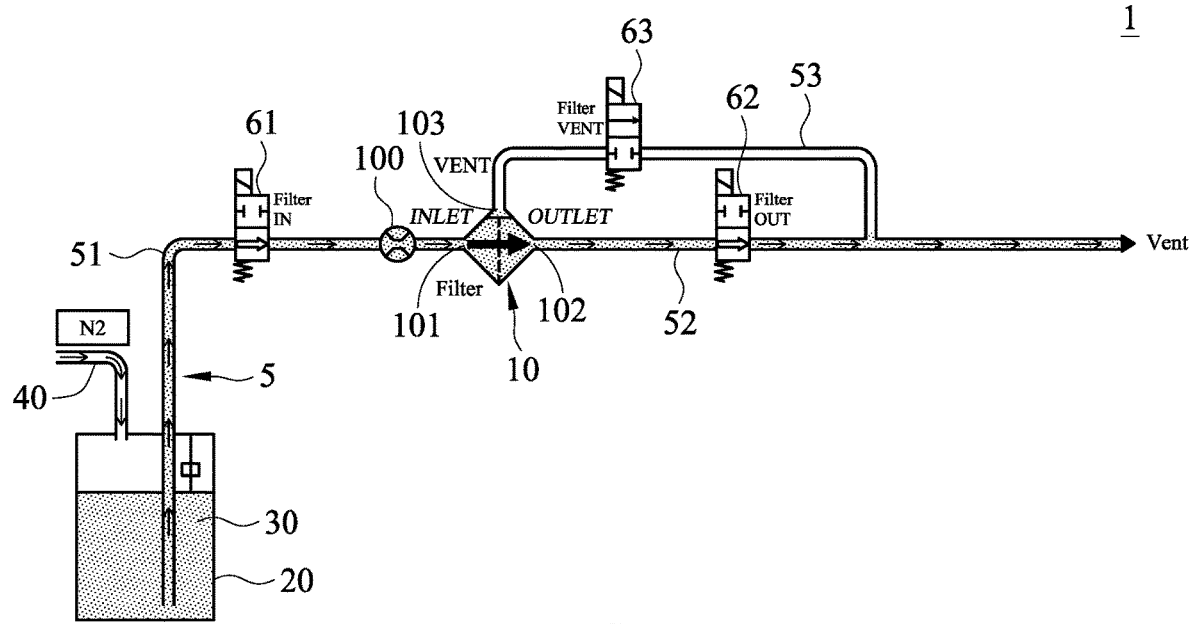

FIG. 1A and FIG. 1B are schematic diagrams showing a pre-wet system according to an embodiment of the present invention. As shown in FIGS. 1A and 1B, a storage tank 20 is employed to store a solvent 30. In addition, a first gas 40 (e.g., nitrogen) is supplied to the storage tank 20 to drive the solvent 30 in the storage tank 20 into a piping system 5. The first gas 40 can be provided by a pump (not shown), such as a nitrogen booster pump or a DC pump.

Referring to FIGS. 1A and 1B, a filter 10 to be wetted typically includes, but is not limited to: an inlet 101, an outlet 102, and a vent 103. After the filter 10 is pre-wetted by the pre-wet system 1, it will be used to remove unwanted impurities from a semiconductor process solution, such as a solution, e.g., a photoresist, a developer, or an anti-reflection coating solution, used for semiconductor lithography, etching, cleaning, or other semiconductor processes. The piping system 5 includes pipelines for the pre-wetting procedure and may include an inlet pipeline 51, an outlet pipeline 52, and a vent pipeline 53. The inlet pipeline 51 connects the storage tank 20 to the inlet 101 of the filter 10, the outlet pipeline 52 connects the outlet 102 of the filter 10 to a waste liquid collection zone (vent), and the vent pipeline 53 connects the vent 103 of the filter 10 to the waste liquid collection zone (vent).

Referring to FIGS. 1A and 1B, control valves 61-63 may be provided at the inlet pipeline 51, the outlet pipeline 52, and the vent pipeline 53, respectively, and a control system (not shown) connects to these control valves 61-63 for controlling the path of solvent 30. In the exemplary embodiment, the control valves 61-63 comprises, but are not limited to, 2-way solenoid valves. In addition, a flow meter 100 is provided at the inlet pipeline 51. The control system is connected to the flow meter 100 and the pump to adjust the flow rate of the first gas 40 and/or the solvent 30 according to the measurement of the flow meter and/or other parameters (e.g., pressure).

Referring to FIG. 1A, the control valve 61 and control valve 63 are opened while control valve 62 is closed by the control system. Consequently, the solvent 30 flows from the storage tank 20 to the inlet pipeline 51, enters the filter 10 through the inlet 101 and cleans the filter 10, and then is discharged from the vent 103 of the filter 10 to the vent pipeline 53 and finally discharged to a waste liquid collection zone (vent).

Referring to FIG. 1B, the control valves 61 and control valve 62 are opened while control valve 63 is closed by the control system. The solvent 30 flows from the storage tank 20 to the inlet pipeline 51, enters the filter 10 through the inlet 101 of the filter 10 and cleans the filter 10, and then is discharged from the outlet 102 of the filter 10 to the outlet pipeline 52 and finally discharged to the waste liquid collection zone (vent).

It takes a period for the filter 10 to reach a complete wet and clean state. Therefore, the system shown in FIGS. 1A and 1B will consume a lot of solvent in the long run. In addition, the solvent used in this system is directly discharged without being recycled, increasing the cost of waste treatment.

Figure 2:
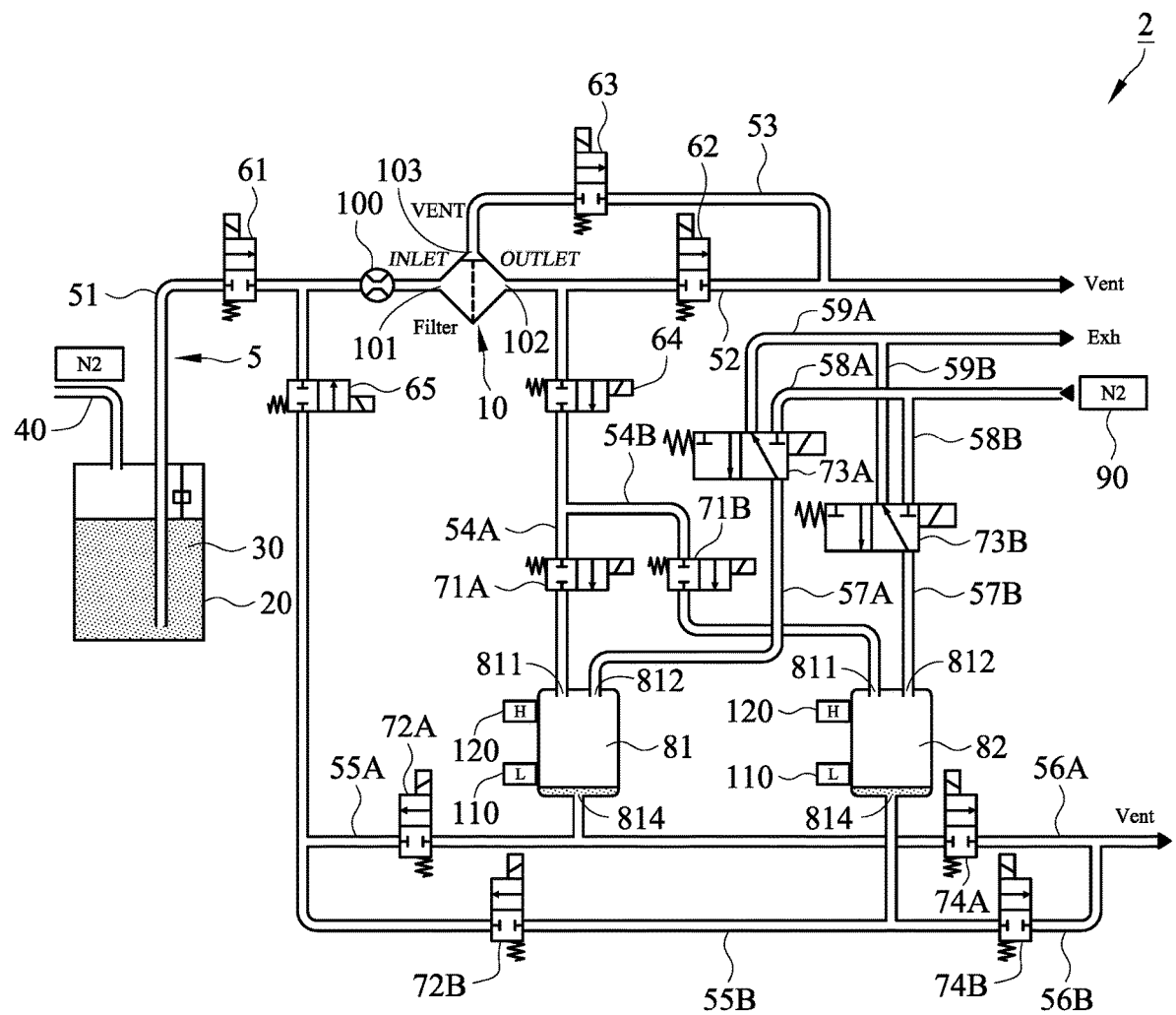
FIG. 2 shows a pre-wet system in accordance with a preferred embodiment of the present invention.

FIG. 2 shows a pre-wet system 2 according to a preferred embodiment of the present invention. This embodiment takes one filter 10 as an example, but the number of filters 10 is not limited to one. In addition, the filter 10 is not limited to the type shown in the figures, and the system 2 may be applied to other filters having multiple outlets and vents. In one embodiment, the filter does not contain vents. In some embodiments, the filter 10 comprises, but is not limited to, a filter manufactured by Entegris or Pall companies.

Referring to FIG. 2, compared with FIG. 1A and FIG. 1B, the pre-wet system 2 further includes a first buffer tank 81 and a second buffer tank 82. In addition, the piping system 5 further includes a first circulation loop and a second circulation loop in addition to the original cleaning pipeline including the inlet pipeline 51, the outlet pipeline 52, and the vent pipeline 53. In the exemplary embodiment, the first circulation loop may be constituted by the cleaning pipeline, a first receiving pipeline 54A, and a first returning pipeline 55A. The first buffer tank 81 is connected to the filter 10 through the first receiving pipeline 54A to store the solvent 30 discharged from the filter 10. The first buffer tank 81 can also return the stored solvent 30 to the filter 10 through the first returning pipeline 55A.

Referring to FIG. 2, in the exemplary embodiment, the second circulation loop may be composed of the cleaning pipeline, a second receiving pipeline 54B, and a second returning pipeline 55B. The second buffer tank 82 is connected to the filter 10 through the second receiving pipeline 54B to store the solvent 30 discharged from the filter 10. The second buffer tank 82 can also return the stored solvent 30 to the filter 10 through the second returning pipeline 55B.

Referring to FIG. 2, in addition, a second gas 90 (e.g., nitrogen gas) is provided to drive the solvent 30 in the first buffer tank 81 or the second buffer tank 82. The second gas 90 can be provided by the same pump described above or by another pump (not shown), such as another nitrogen booster pump or another direct current pump.

Referring to FIG. 2, the first buffer tank 81 and the second buffer tank 82 may respectively include a solvent inlet 811, a gas port 812, and a solvent outlet 814. The first receiving pipeline 54A or the second receiving pipeline 54B is connected to the solvent inlet 811, the first returning pipeline 55A or the second returning pipeline 55B is connected to the solvent outlet 814, and the second gas 90 enters or exits the first buffer tank 81 or the second buffer tank 82 through the gas port 812.

Referring to FIG. 2, the pre-wet system 2 may further include a first buffer tank gas pipeline 57A, a first buffer tank gas inlet pipeline 58A, a first buffer tank gas outlet pipeline 59A, and a control valve 73A. The first buffer tank gas pipeline 57A is connected to the gas port 812 of the first buffer tank 81. In addition, the control valve 73A connects with the first buffer tank gas pipeline 57A, the first buffer tank gas inlet pipeline 58A, and the first buffer tank gas outlet pipeline 59A to control the path of the second gas 90. Such that the second gas 90 enter the first buffer tank 81 through the first buffer tank gas inlet pipeline 58A and the first buffer tank gas pipeline 57A. Alternatively, the second gas 90 is discharged from the first buffer tank 81 to the exhaust system (Exh) via the first buffer tank gas pipeline 57A and the first buffer tank gas outlet pipeline 59A. In the exemplary embodiment, the control valve 73A comprises, but is not limited to, a 3-way solenoid valve.

Referring to FIG. 2, the pre-wet system 2 may further include a second buffer tank gas pipeline 57B, a second buffer tank gas inlet pipeline 58B, a second buffer tank gas outlet pipeline 59B, and a control valve 73B. The second buffer tank gas pipeline 57B is connected to the gas port 812 of the second buffer tank 82. In addition, the control valve 73B connects with the second buffer tank gas pipeline 57B, the second buffer tank gas inlet pipeline 58B, and the second buffer tank gas outlet pipeline 59B to control the path of the second gas 90. Such that the second gas 90 enter the second buffer tank 82 through the second buffer tank gas inlet pipeline 58B and the second buffer tank gas pipeline 57B. Alternatively, the second gas 90 is discharged from the second buffer tank 82 to the exhaust system (Exh) via the second buffer tank gas pipeline 57B and the second buffer tank gas outlet pipeline 59B. In the exemplary embodiment, the control valve 73B comprises, but is not limited to, a 3-way solenoid valve.

Referring to FIG. 2, a control valve 71A may be positioned at the first receiving pipeline 54A to control whether the solvent 30 flows into the first buffer tank 81, and a control valve 71B may be positioned at the second receiving pipeline 54B to control whether the solvent 30 flows into the second buffer tank 82. In the exemplary embodiment, the control valve 71A and the control valve 71B comprises, but are not limited to, 2-way solenoid valves.

Referring to FIG. 2, a control valve 72A may be positioned at the first returning pipeline 55A to control whether the solvent 30 passes through the control valve 72A, and a control valve 72B may be positioned the second returning pipeline 55B to control whether the solvent 30 passes through the control valve 72B. In the exemplary embodiment, the control valve 72A and the control valve 72B comprises, but are not limited to, 2-way solenoid valves.

Referring to FIG. 2, the pre-wet system 2 may further include a first solvent discharge pipeline 56A and a second solvent discharge pipeline 56B. The first buffer tank 81 can discharge the solvent through the first solvent discharge pipeline 56A, and the second buffer tank 82 can discharge the solvent through the second solvent discharge pipeline 56B. In addition, a control valve 74A may be provided at the first solvent discharge pipeline 56A to control whether the solvent 30 passes through the control valve 74A, and a control valve 74B may be provided at the second solvent discharge pipeline 56B to control whether the solvent 30 passes through the control valve 74B. In the exemplary embodiment, the control valve 74A and the control valve 74B comprise, but are not limited to, 2-way solenoid valves.

Referring to FIG. 2, a control valve 64 may be provided at the confluence of the first and second receive pipelines 54A and 54B, and a control valve 65 at the confluence of the first and second returning pipelines 55A, 55A. The control valve 64 and the control valve 65 control whether the solvent is allowed to pass through. In the exemplary embodiment, the control valve 64 and the control valve 65 comprise, but are not limited to, 2-way solenoid valves.

According to the pre-wet system of FIG. 2, a normal pre-wet and cleaning operation can be proceeded and the two buffer tanks can alternately recycle the solvent for reuse. The details are described as follows:

(1) Cleaning from Filter Vent Path

Referring to FIG. 2, the control valves 61 and 63 are opened while the other control valves are closed, such that the solvent 30 flows from the storage tank 20 to the inlet pipeline 51 and enters the filter 10 from the inlet 101 to pre-wet the filter 10. After pre-wetting and cleaning, the solvent 30 is discharged from the vent 103 to the vent pipeline 53 and finally discharged into the waste liquid collection zone (vent).

(2) Pre-Wet/Cleaning from Filter Outlet Path

Referring to FIG. 2, the control valves 61 and 62 are opened while the other control valves are closed, such that the solvent 30 enters the filter 10 from the inlet 101, and then passes through the outlet 102 of the filter 10, and finally discharged to the outlet pipeline 52 and the waste liquid collection zone (vent). Typically, the filter outlet path is primary, while the filter vent path is secondary.

(3) Filling the First Buffer Tank

Figure 3:
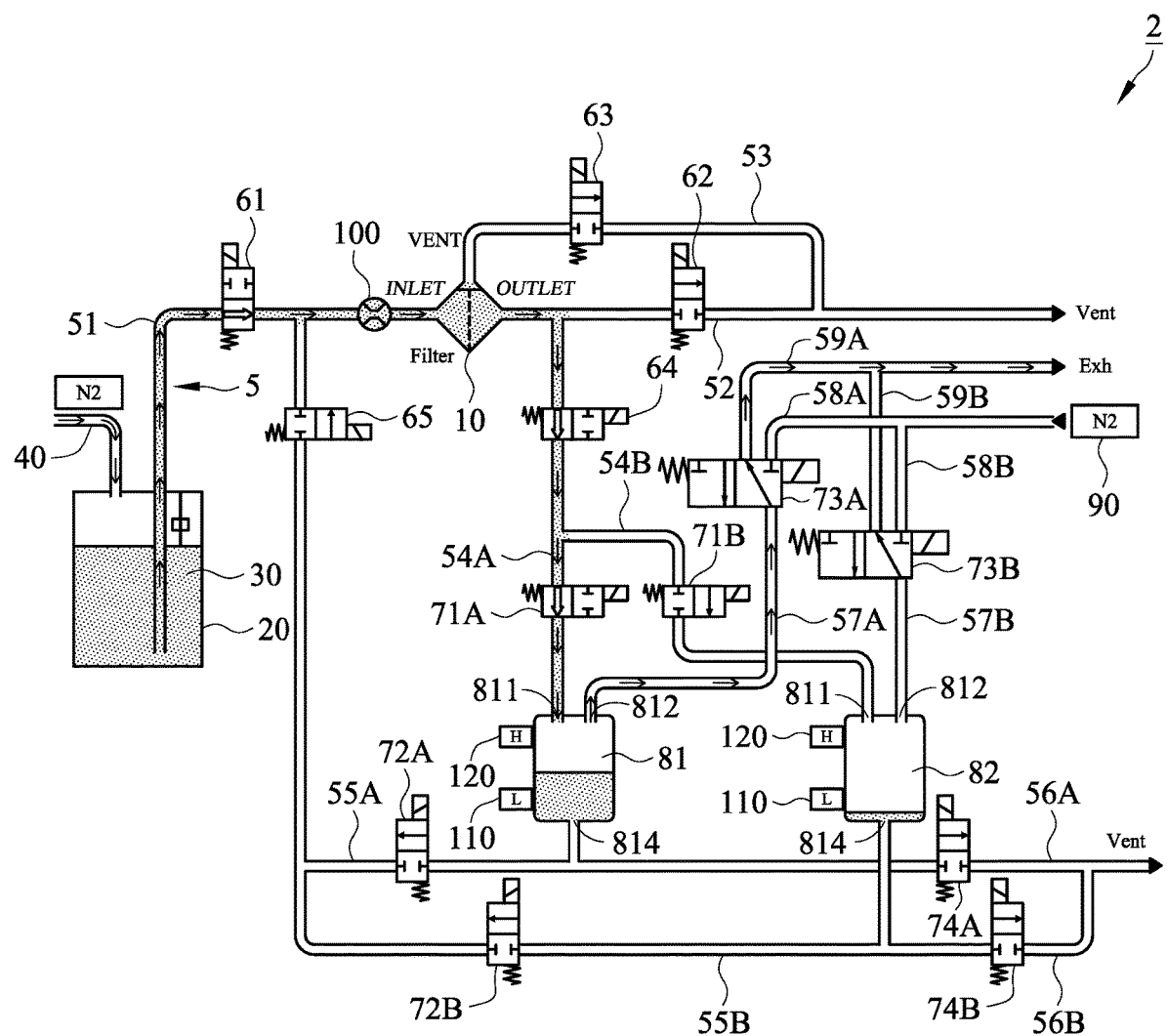
FIG. 3 shows the operation to fill a first buffer tank of the pre-wet system according to FIG. 2.

FIG. 3 shows the operation to fill the first buffer tank 81 in the pre-wet system according to FIG. 2. Referring to FIG. 3, the control valves 61, 64, and 71A are opened, the control valve 73A is switched to communicate with the first buffer tank gas outlet pipeline 59A, and the other control valves are closed. After the solvent 30 pre-wets the filter 10, it flows into the first buffer tank 81, and the gas within the first buffer tank 81 is discharged from the first buffer tank gas outlet pipeline 59A.

(4) Filling the Second Buffer Tank

Figure 4:
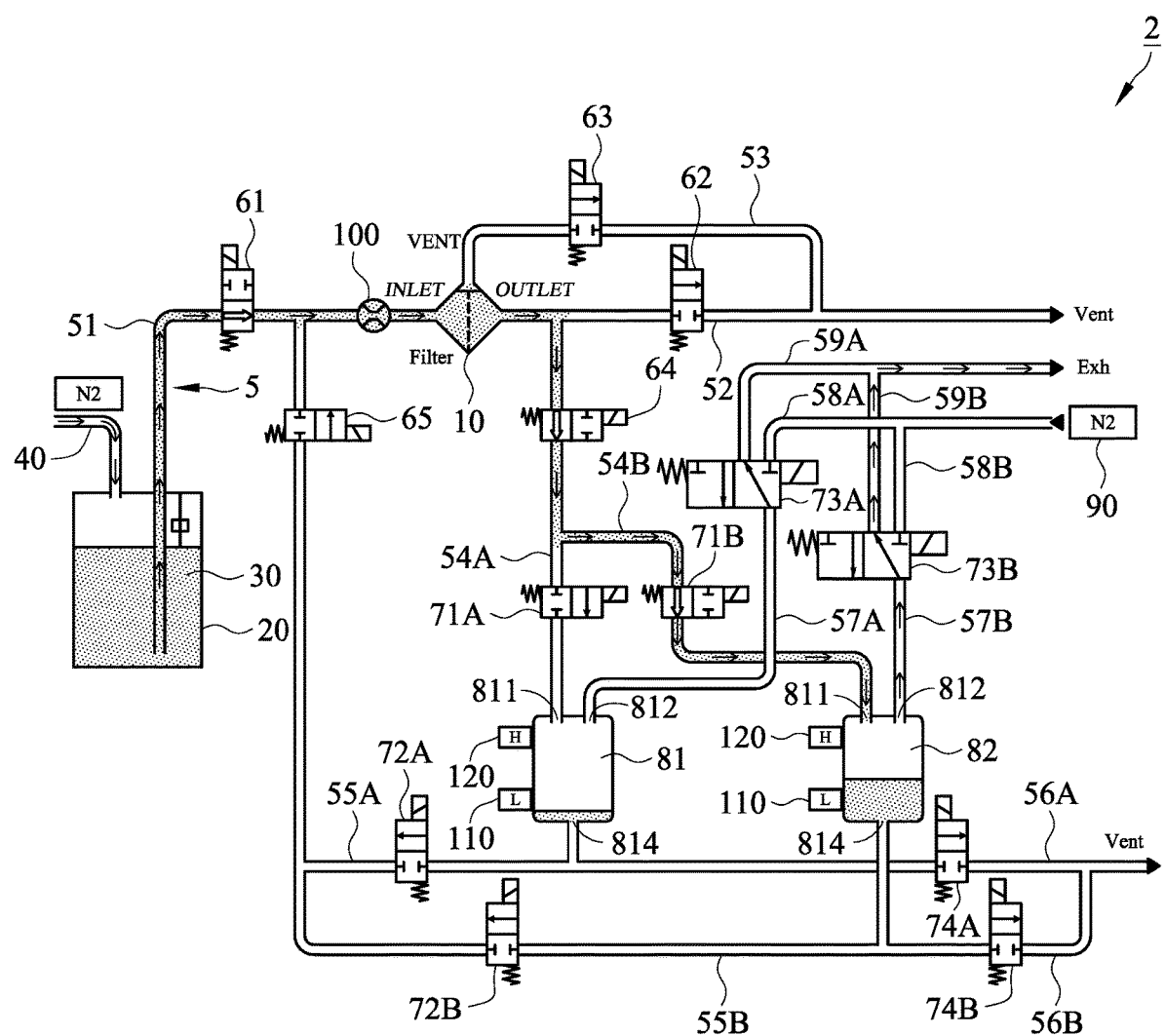
FIG. 4 shows the operation to fill a second buffer tank of the pre-wet system according to FIG. 2.

FIG. 4 shows the operation to fill the second buffer tank 82 in the pre-wet system according to FIG. 2. Referring to FIG. 4, the control valves 61, 64, and 71B are opened, the control valve 73B is switched to communicate with the second buffer tank gas outlet pipeline 59B, and the other control valves are closed. After the solvent 30 pre-wets the filter 10, it flows into the second buffer tank 82, and the gas within the second buffer tank 82 is discharged from the second buffer tank gas outlet pipeline 59B.

(5) Recovering the Solvent in the First Buffer Tank 81 and Simultaneously Filling the Second Buffer Tank 82

Figure 5:
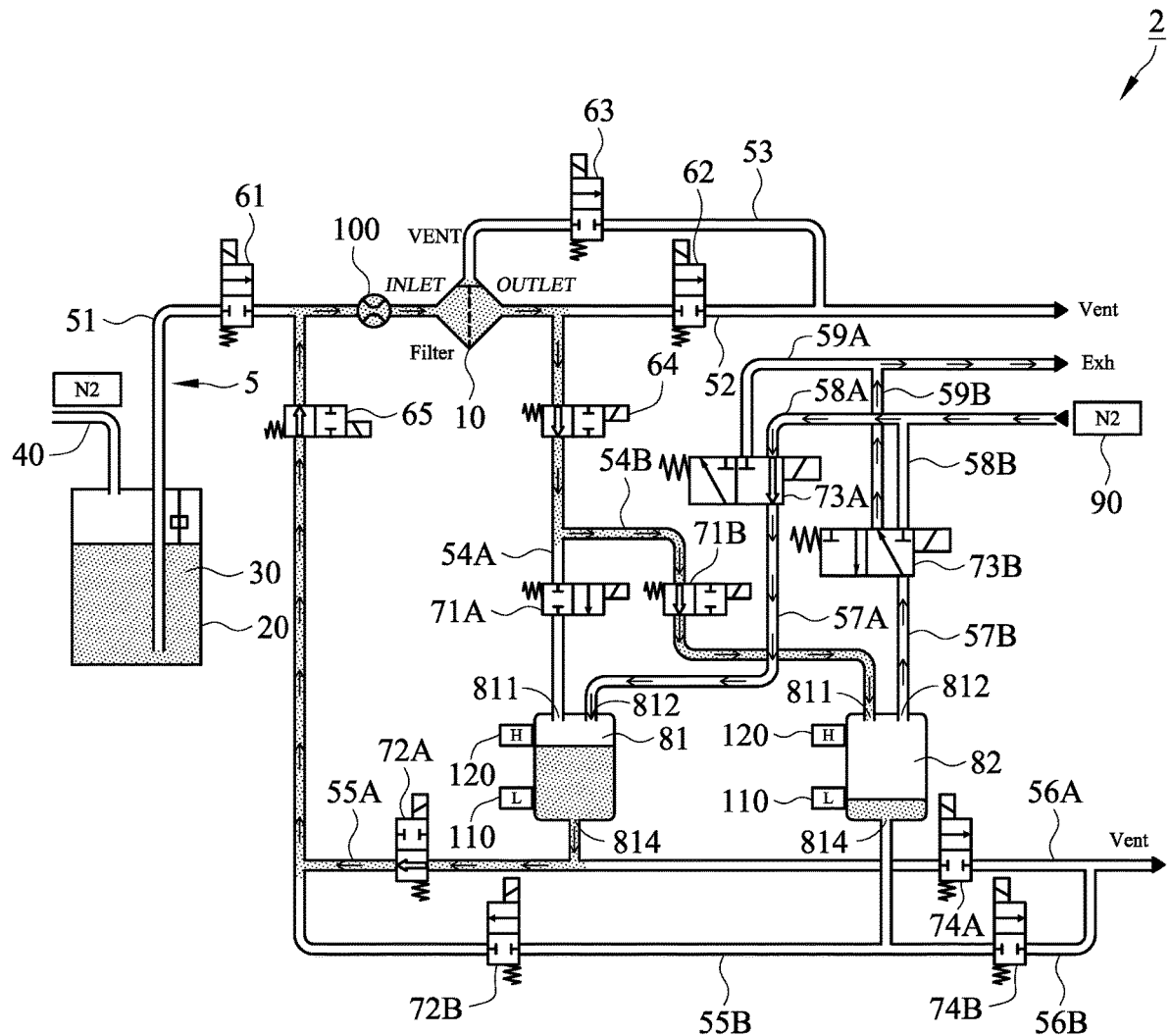
FIG. 5 shows the operation to recover the solvent in the first buffer tank and simultaneously to fill the second buffer tank of the pre-wet system according to FIG. 2.

FIG. 5 shows the operation to recover the solvent in the first buffer tank 81 and simultaneously to fill the second buffer tank 82 in the pre-wet system according to FIG. 2. Referring to FIG. 5, the control valves 64, 65, 71B, and 72A are opened, the control valve 73A is switched to communicate with the first buffer tank gas inlet pipeline 58A, the control valve 73B is switched to communicate with the second buffer tank gas outlet pipeline 59B, and the other control valves are closed. As such, the second gas 90 drives the solvent in the first buffer tank 81 to return to the filter 10 through the first returning pipeline 55A. After the solvent 30 pre-wets the filter 10, it flows into the second buffer tank 82, and the gas in the second buffer tank 82 is discharged from the second buffer tank gas outlet pipeline 59B to the exhaust system (Exh).

(6) Recovering the Solvent in the Second Buffer Tank 82 and Simultaneously Filling the First Buffer Tank 81

Figure 6:
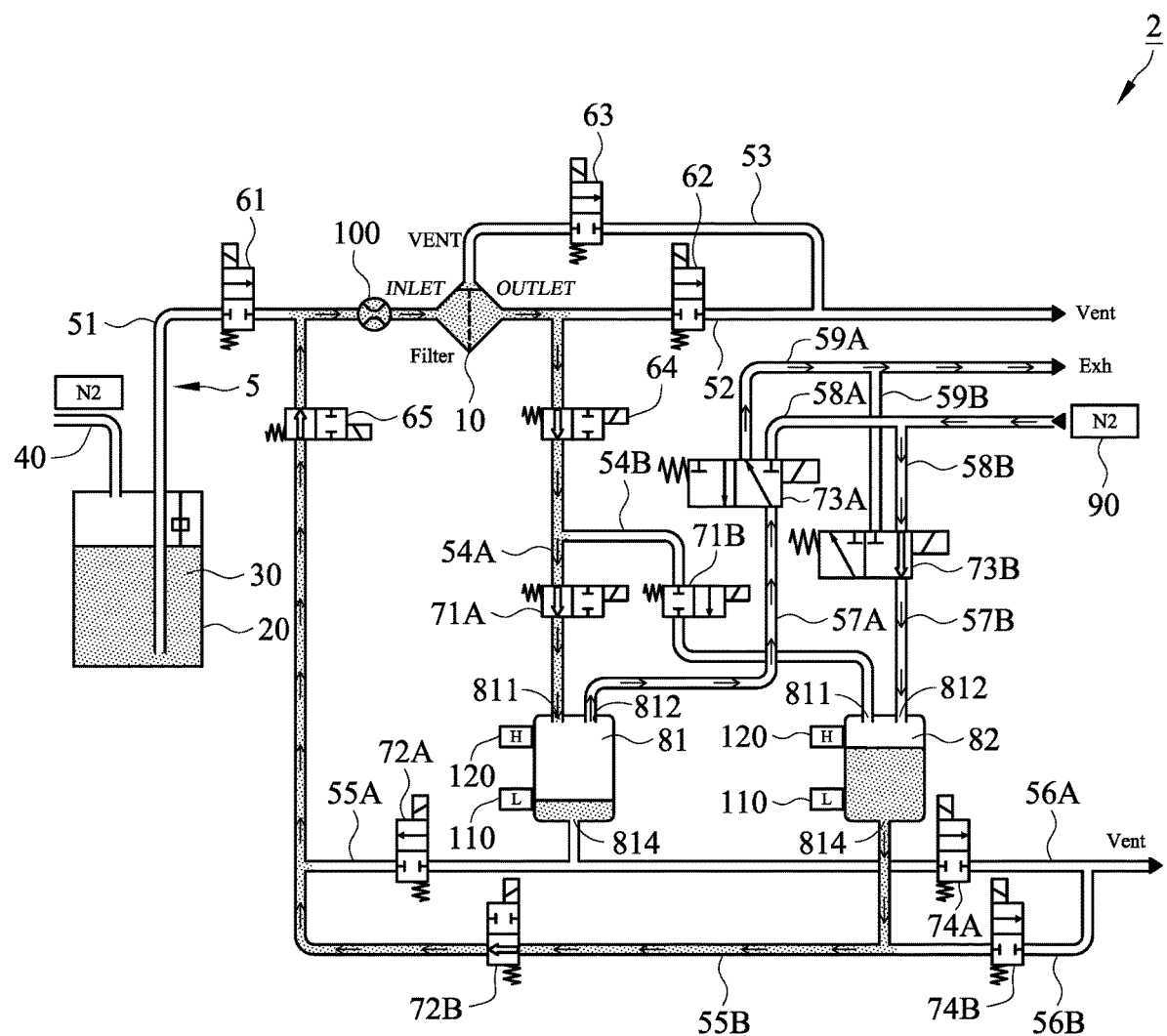
FIG. 6 shows the operation to recover the solvent in the second buffer tank and simultaneously to fill the first buffer tank of the pre-wet system according to FIG. 2.

FIG. 6 shows the operation to recover the solvent in the second buffer tank 82 and simultaneously to fill the first buffer tank 81 in the pre-wet system according to FIG. 2. Referring to FIG. 6, the control valves 64, 65, 71A, 72B are opened, the control valve 73A is switched to communicate with the first buffer tank gas outlet pipeline 59A, the control valve 73B is switched to communicate with the second buffer tank gas inlet pipeline 58B, and the other control valves are closed. As such, the second gas 90 drives the solvent in the second buffer tank 82 to return to the filter 10 through the second returning pipeline 55B. After the solvent 30 pre-wets the filter 10, it flows into the first buffer tank 81, and the gas in the first buffer tank 81 is discharged from the first buffer tank gas outlet pipeline 59A to the exhaust system (Exh).

Figure 7:
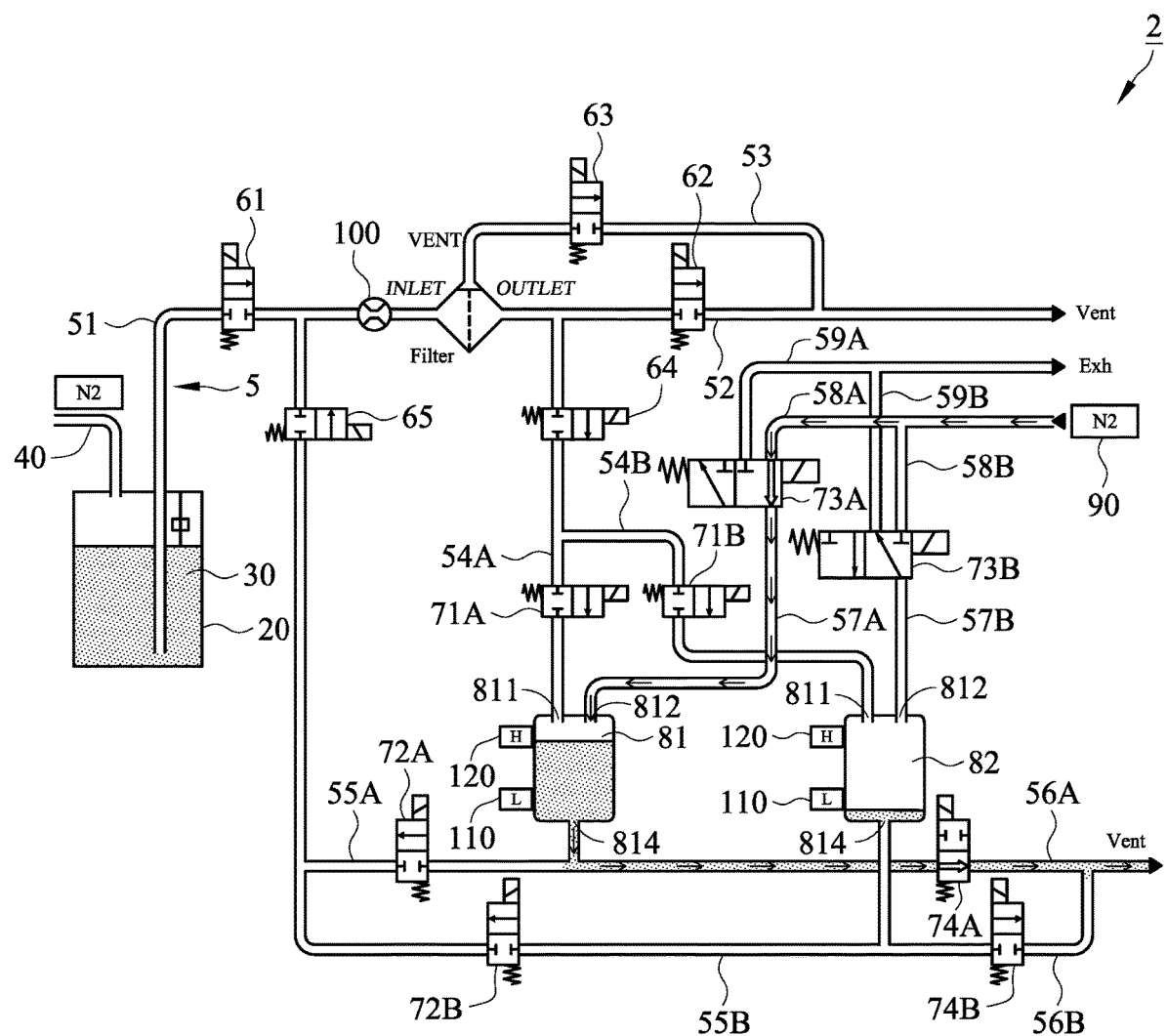
FIG. 7 shows the operation to discharge the solvent in the first buffer tank to a waste liquid collection zone of the pre-wet system according to FIG. 2.

(7) Discharging the Solvent in the First Buffer Tank 81 to the Waste Liquid Collection Zone FIG. 7 shows the operation to discharge the solvent in the first buffer tank 81 to the waste liquid collection zone (vent) in the pre-wet system according to FIG. 2. Referring to FIG. 7, the control valve 74A is opened, the control valve 73A is switched to communicate with the first buffer tank gas inlet pipeline 58A, and the other control valves are closed. The second gas 90 drives the solvent in the first buffer tank 81 to be discharged to the waste liquid collection zone (vent) via the first solvent discharge pipeline 56A.

Figure 8:
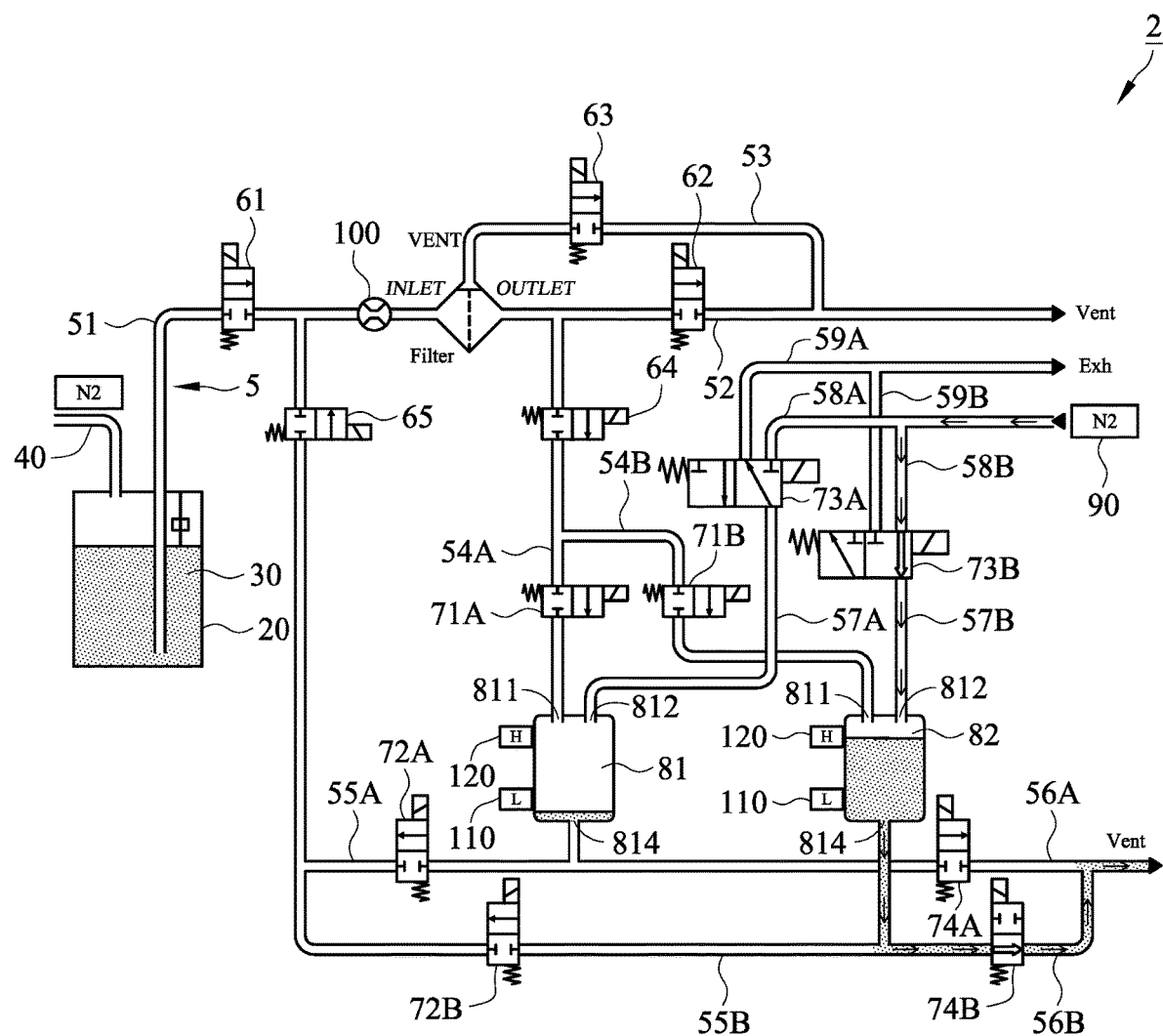
FIG. 8 shows the operation to discharge the solvent in the second buffer tank to a waste liquid collection zone of the pre-wet system according to FIG. 2.

(8) Discharging the Solvent in the Second Buffer Tank 82 to the Waste Liquid Collection Zone FIG. 8 shows the operation to discharge the solvent in the second buffer tank 82 to the waste liquid collection zone in the pre-wet system according to FIG. 2. Referring to FIG. 8, the control valve 74B is opened, and the control valve 73B is switched to communicate with the second buffer tank gas inlet pipeline 58B, and the other control valves are closed. The second gas 90 drives the solvent in the second buffer tank 82 to be discharged to the waste liquid vent via the second solvent discharge pipeline 56B.

Referring to FIGS. 2, 7, and 8, the pre-wet system 2 may include a sampling point (FIG. 10) to monitor the quality of the solvent 30.

In one embodiment, the control system includes a programmable logic controller (PLC) and a human machine interface (HMI). Users can select the required operations and times via the human-machine interface according to their needs. The operation can be one or a combination of the above-mentioned operations. Typically, operation (5) and operation (6) are performed alternately and can be performed by automatic control.

Referring to FIG. 5, the first buffer tank 81 may include a high level sensor 120 and a low level sensor 110 respectively being connected to the control system and being used to detect whether the level of the solvent in the first buffer tank reaches a high level (H) and a low level (L). When the high level sensor 120 detects that the solvent in the first buffer tank 81 reaches the high level (H), the second gas 90 drives the solvent in the first buffer tank 81 to flow back to the filter 10 and then the solvent is delivered to the second buffer tank 82 via the piping system. The above procedure corresponds to the mentioned operation (5). When the low level sensor 110 detects that the solvent in the first buffer tank 81 reaches the low level (L), the second gas 90 drives the solvent in the second buffer tank 82 to flow back to the filter 10 and then the solvent is delivered to the first buffer tank 81 via the piping system. The above procedure corresponds to the mentioned operation (6).

Referring to FIG. 6, the second buffer tank 82 may also include a high level sensor 120 and a low level sensor 110 respectively being connected to the control system and being used to detect whether the level of the solvent in the second buffer tank 82 reaches a high level (H) and a low level (L). When the high level sensor 120 detects that the solvent in the second buffer tank 82 reaches the high level (H), the second gas 90 drives the solvent in the second buffer tank 82 to flow back to the filter 10 and then the solvent is delivered to the first buffer tank 81 via the piping system. The above procedure corresponds to the mentioned operation (6). When the low level sensor 110 detects that the solvent in the second buffer tank 82 reaches the low level (L), the second gas 90 drives the solvent in the first buffer tank 81 to return to the filter 10 and then the solvent is delivered to the second buffer tank 82 via the piping system. The above procedure corresponds to the mentioned operation (5).

Figure 9:
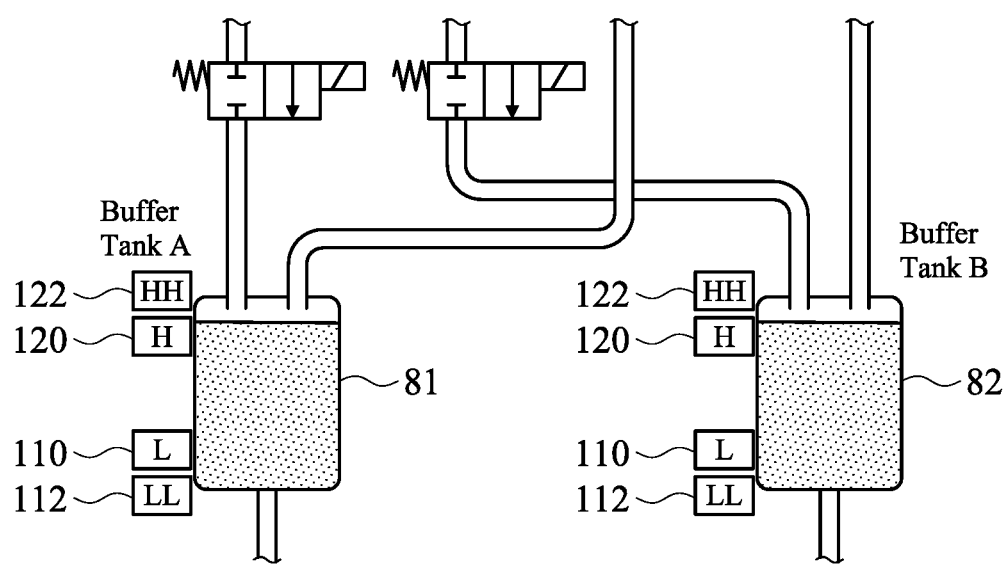
FIG. 9 shows an alternative of the first and second buffer tanks of the pre-wet system according to FIG. 2.

FIG. 9 is a partial enlarged view of the system shown in FIG. 2. Referring to FIG. 9, in another embodiment the first buffer tank 81 and the second buffer tank 82 may further include a high-high-level sensor 122 and a low-low-level sensor 112 respectively used to detect whether the liquid level of the solvent in the first buffer tank 81 and the second buffer tank 82 reaches a high-high-level (HH) and a low-low-level (LL). The high-high-level (HH) is higher than the high level (H), and the low-low-level (LL) is lower than the low level (L). When the high-high-level sensor 122 detects that the solvent in the first buffer tank 81 or the second buffer tank 82 reaches the high-high-level (HH), or when the low-low-level sensor 112 detects the solvent in the first buffer tank 81 or the second buffer tank 82 reaches the low-low-level, the control system stops operating the pre-wet system. The tank may overflow or exhaust due to the faulty or wrong of the high-level sensor 120 or the low-level sensor 110, resulting in the generation of air bubbles in the pipelines. The high-high-level sensor 122 and the low-low-level sensor 112 can avoid this situation, thereby improving the security and reliability of the entire system.

Figure 10:
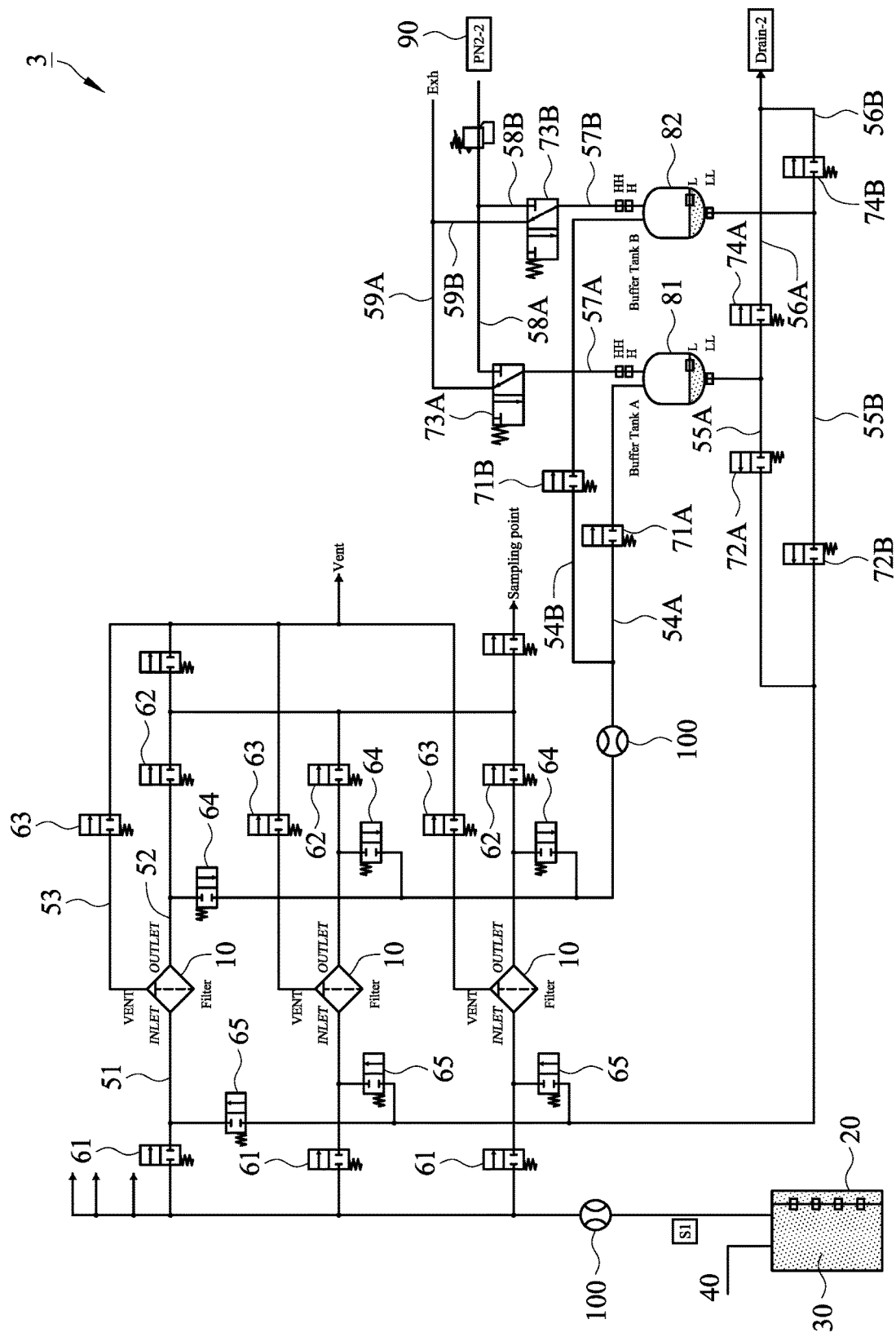
FIG. 10 shows a pre-wet system according to another preferred embodiment of the present invention.

The pre-wet system 2 shown in FIGS. 2-8 illustrates an example of a single filter with two buffer tanks. In some embodiments, the system includes multiple filters with same or different specifications and two buffer tanks for alternately recycling the solvent. FIG. 10 shows a pre-wet system 3 according to an embodiment of the present invention. The pre-wet system 3 employs the first buffer tank 81 and the second buffer tank 82 to alternately recycle solvent discharged from a plurality of filters 10. Each filter 10 includes a cleaning pipeline that may include, but not limited to: an inlet pipeline 51, an outlet pipeline 52, and a vent pipeline 53. In some embodiments, the number of filters 10 is 2 to 6. A first receiving pipeline 54A and a first returning pipeline 55A connects to the first buffer tank 81 and forms a first circulation loop with the cleaning pipeline of each filter 10. A second receiving pipeline 54B and a second returning pipeline 55B connects to the second buffer tank 82 and forms a second circulation loop with the cleaning pipeline of each filter 10. The operation of the pre-wet system 3 is similar to that of the pre-wet system 2.

For brevity and convenience of illustration, the above-mentioned pre-wet system 2 and the pre-wet system 3 have omitted some minor components. In addition, the pre-wet system 2 and the pre-wet system 3 may include other functional devices or modules if required.

Although specific embodiments have been illustrated and described, it will be appreciated by those skilled in the art that various modifications may be made without departing from the scope of the present invention, which is intended to be limited solely by the appended claims.

What is claimed is:

1. A pre-wet system, comprising:
a piping system;
a storage tank containing a solvent;
a filter connected to the piping system;
a first gas for driving the solvent in the storage tank to the filter via the piping system;
a first buffer tank connected to the filter via the piping system to store the solvent discharged from the filter;
a second buffer tank connected to the filter via the piping system to store the solvent discharged through the filter;
a second gas for selectively driving the solvent in the first buffer tank to return to the filter and then to be discharged to the second buffer tank via the piping system, or the second gas selectively driving the solvent in the second buffer tank to return to the filter and then to be discharged to the first buffer tank via the piping system; and a control system that determines a path of the solvent wherein the first buffer tank further comprises: a high-level sensor connected to the control system; and a low-level sensor connected to the control system; wherein: when the high-level sensor detects that the solvent in the first buffer tank reaches a high level, the second gas drives the solvent in the first buffer tank to return to the filter and then to be discharged to the second buffer tank via the piping system; when the low-level sensor detects that the solvent in the first buffer tank reaches a low level, the second gas drives the solvent in the second buffer tank to return to the filter and then to be discharged to the first buffer tank via the piping system.

2. The pre-wetting system according to claim 1, wherein each of the first buffer tank and the second buffer tank comprises:
   a solvent inlet for receiving the solvent discharged from the filter;
   a gas port for discharging gas or receiving the second gas; and
   a solvent outlet for discharging the solvent.

3. The pre-wet system according to claim 2, further comprising a control valve between the filter and the solvent inlet to control whether the solvent enters the first buffer tank or the second buffer tank.

4. The pre-wet system according to claim 2, further comprising a control valve between the second gas and the gas port to control the second gas to be discharged or entered from the gas port.

5. The pre-wet system according to claim 4, wherein when the second gas drives the solvent in the first buffer tank to flow back to the filter and then to be discharged to the second buffer tank via the piping system, the second gas enters the first buffer tank from the gas port of the first buffer tank, and the second gas in the second buffer tank is discharged from the gas port of the second buffer tank.

6. The pre-wet system according to claim 4, wherein when the second gas drives the solvent in the second buffer tank to return to the filter and then to be discharged to the first buffer tank via the piping system, the second gas enters the second buffer tank from the gas port of the second buffer tank, and the second gas in the first buffer tank is discharged from the gas port of the first buffer tank.

7. The pre-wet system according to claim 2, further comprising at least one control valve between the filter and the solvent outlet to control whether the solvent is returned to the filter.

8. The pre-wet system according to claim 1, wherein each of the first buffer tank and the second buffer tank comprises:
   a high-high-level sensor connected to the control system; and
   a low-low-level sensor connected to the control system; wherein: when the high-high-level sensor detects that the solvent in the first buffer tank or the second buffer tank reaches a high-high-level, or when the low-low-level sensor detects that solvent in the first buffer tank or the second buffer tank reaches a low-low-level, the pre-wet system is stopped.

9. The pre-wet system according to claim 1, wherein the piping system comprises a cleaning pipeline, a first circulation loop, and a second circulation loop, the solvent enters and leaves the filter through the cleaning pipeline, a first receiving pipeline and a first returning pipeline connected to the first buffer tank constitute the first circulation loop with the cleaning pipeline, a second receiving pipeline and a second returning pipeline connected to the second buffer tank constitute the second circulation loop with the cleaning pipeline.

10. A pre-wet system, comprising:
   a piping system;
   a storage tank containing a solvent;
   a plurality of filters connected to the piping system;
   a first gas for driving the solvent in the storage tank to each of the plurality of filters via the piping system;
   a first buffer tank connected to each of the plurality of filters via the piping system to store the solvent discharged from each of the plurality of filters;
   a second buffer tank connected to each of the plurality of filters via the piping system to store the solvent discharged through each of the plurality of filters;
   a second gas for selectively driving the solvent in the first buffer tank to return to each of the plurality of filters and then to be discharged to the second buffer tank via the piping system, or the second gas selectively driving the solvent in the second buffer tank to return to each of the plurality of filters and then to be discharged to the first buffer tank via the piping system; and
   a control system that determines a path of the solvent wherein the second buffer tank further comprises: a high-level sensor connected to the control system; and a low-level sensor connected to the control system; wherein: when the high-level sensor detects that the solvent in the second buffer tank reaches a high level, the second gas drives the solvent in the second buffer tank to return to the filter and then to be discharged to the first buffer tank via the piping system; when the low-level sensor detects that the solvent in the second buffer tank reaches a low level, the second gas drives the solvent in the first buffer tank to return to the filter and then to be discharged to second buffer tank via the piping system.

* * * * *